Patented May 11, 1937

2,080,057

UNITED STATES PATENT OFFICE 2,080,057

AROMATIC CONDENSATION PRODUCTS

Heinrich Neresheimer and Wilhelm Ruppel, Ludwigshafen-on-the-Rhine, Germany, assignors to General Aniline Works, Inc., New York, N. Y., a corporation of Delaware No Drawing. Application December 22, 1933, Serial No. 703,679. In Germany December 24, 1932

10 Claims. (Cl. 260—64)

The present invention relates to aromatic condensation products and a process of producing same.

We have found that condensation products are obtained by causing an aromatic component containing one group X selected from the class consisting of the nitro- and nitroso group, the said component corresponding to the general formula—

wherein at least one Y represents a hydrogen atom, a halogen atom or an alkoxy group and wherein condensed rings may be attached to the benzene nucleus, to react in the presence of an alkaline condensing agent with a component containing a carbon atom to which at least two hydrogen atoms are attached and containing directly connected with the said carbon atom a grouping activating the said hydrogen atoms, the said grouping being selected from the class consisting of the carbonyl group, nitrile group and the amidated and esterified carboxylic acid groups. Usually the components which are caused to react with one another are separate compounds. They may, however, be contained also in one molecule. In this case an intramolecular condensation occurs.

Suitable compounds containing hydrogen atoms activated in the manner set forth above are for example acetic acid esters, aceto acetic ester, aceto nitrile, acetophenone, malonic nitrile, benzyl cyanide, succinimide, succinic acid esters, cyclohexanone and the tetra-hydronaphthalones.

As alkaline condensing agents may be mentioned for example alkali metal hydroxides such as potassium hydroxide and sodium hydroxide, sodamide and sodium sulphide and alkali metal alcoholates. The condensation may be carried out in aqueous or organic non-acid media, as for example in benzene, chlorobenzene or pyridine, or without diluents. The temperature may vary within wide limits depending on the reaction components and in some cases it is preferable to apply cooling while in other cases the reaction must be carried out at elevated temperatures, as for example at the boiling point of the diluent employed.

According to analysis and reactions of the resulting products it is probable that in the simplest case the products are formed by the addition of one molecule of the component containing the activated hydrogen atoms to one molecule of the nitro or nitroso compound with simultaneous or subsequent splitting off of hydrogen or hydrogen halide. The hydrogen split off may in some cases partly reduce the nitro or nitroso groups, especially when the reaction is carried out in the absence of substances absorbing hydrogen, for example in a nitrogen atmosphere.

For example by the condensation of para-nitrochlorbenzene with benzyl cyanide in the presence of potassium hydroxide in pyridine while passing through the reaction mixture a current of nitrogen, a deep blue colored solution or suspension is obtained which probably contains the potassium salt of aci-para-nitro-diphenylacetonitrile because by treating this potassium compound with acids a compound free from halogen is obtained which crystallizes in the form of colorless prisms and which is a nitro-diphenylacetonitrile according to analysis.

If, on the other hand, nitrobenzene be condensed with benzyl cyanide under the same conditions, a deep blue liquid is formed from which not only the said nitro-diphenylacetonitrile but also a product which crystallizes in the form of golden yellow prisms is obtained. According to analysis and properties, the latter compound is a reduction product of the said nitro compound, namely a hydroxylaminodiphenylacetonitrile, which is probably the para-compound.

The condensation may be carried out in the absence or in the presence of oxygen or air. In some cases better results are obtained when oxygen or air is present.

In some cases more than one molecular proportion of one component may participate in the condensation; furthermore the primary reaction product may undergo secondary changes, as for example saponification of carboxylalkyl groups. Thus for example by treating a mixture of ortho-nitrochlorobenzene and acetic acid ethyl ester with finely divided potassium hydroxide in boiling benzene among others a product is obtained which according to analysis and properties is a dinitro-dichlordiphenylacetic acid.

The condensation products obtainable according to the present invention are valuable for example as intermediates in the production of dyestuffs or as dyestuffs.

The following examples will further illustrate the nature of this invention but the invention is

Example 1

7.5 parts of benzyl cyanide are introduced during the course of 10 minutes into a mixture of 10 parts of 4-chlornitrobenzene, 42 parts of a paste obtained by grinding equal parts of potassium hydroxide and commercial pyridine (pyridine-base mixture boiling at from 120° to 140° C.) in a ball mill and 100 parts of commercial pyridine which mixture is cooled to 5° below zero C. The mixture when stirred for some time at about zero C. becomes blue violet in color. It is diluted with benzene, filtered by suction, washed with benzene, ether and finally with cold water. The remaining residue as well as the product obtained from the aqueous filtrate by acidification with acetic acid are identical and according to reactions and analysis consist of 4-nitrodiphenyl-acetonitrile. The substance is readily soluble in alcohol, ether and pyridine and crystallizes in the form of colorless prisms from ether. Its solutions in pyridine or alcohol become violet upon the addition of caustic alkalies; by heating the product with chromic acid in glacial acetic acid to boiling, it is converted into the known 4-nitrobenzophenone.

The reaction may also be carried out in aqueous media, as for example in potassium hydroxide solution of about 50 per cent strength, at from about 60° to 70° C.

Example 2

A mixture of 24.6 parts of nitrobenzene, 23.4 parts of benzyl cyanide and 50 parts of pyridine is introduced during the course of half an hour at from 20° to 25° C. into 100 parts of the potassium hydroxide paste employed in Example 1 which has been diluted with 150 parts of pyridine, the whole being stirred for some time at the same temperature. The reaction mixture becomes blue-violet in color; it is worked up as described in Example 1.

By acidification of the aqueous filtrate, a yellow precipitate is obtained which crystallizes from benzene in the form of orange needles and which according to properties and analysis is a hydroxyl-amino-diphenylacetonitrile which is probably 4-hydroxylamino-diphenylacetonitrile. It dissolves in dilute caustic soda solution giving a yellow-brown coloration and in alcoholic alkalies giving an orange-red coloration. It is less readily soluble in alcohol and ether than 4-nitrodiphenyl-acetonitrile. By extracting the aqueous filtrate with ether and concentrating the benzene filtrate and the benzene used for washing, the 4-nitrodiphenylacetonitrile described in Example 1 is obtained.

Other alkaline condensing agents, as for example sodium hydroxide or sodamide, may be employed instead of potassium hydroxide.

Instead of benzyl cyanide other compounds of the kind defined above may be condensed with nitrobenzene in an analogous manner; for example cyclohexanone yields a condensation product the solution of which in pyridine becomes blue upon the addition of caustic potash.

Example 3

32 parts of finely divided potassium hydroxide are introduced a little at a time while cooling, into a mixture of 61.5 parts of nitrobenzene and 59 parts of benzyl cyanide cooled down to 5° below zero C. After a short time the mixture is converted into a solid mass. It is introduced into diluted ice-cooled hydrochloric acid and treated with steam in order to remove unconverted initial material. By drying and crystallization from benzene golden-yellow crystals of the product described in Example 2 are obtained which is probably 4-hydroxylaminodiphenylacetonitrile.

Example 4

A solution of 8 parts of 4-chloronitrobenzene and 6 parts of succinimide in 50 parts of commercial pyridine is introduced while stirring into a suspension of 30 parts of potassium hydroxide in 230 parts of pyridine which has been heated to 105° C. and the whole is boiled for some hours. The reaction mixture is then poured into a large amount of cold water, the olive-brown precipitate which separates is filtered off by suction, washed with water and dried.

The product crystallizes from alcohol in the form of orange-yellow needles and is readily soluble in ether, petroleum ether and pyridine.

Example 5

A solution of 15.8 parts of 2-chlornitrobenzene and 9 parts of acetic acid ethyl ester in 50 parts of benzene is introduced into a boiling suspension of 30 parts of potassium hydroxide in 240 parts of benzene and, the mixture is kept boiling for some time. The reaction liquid at first becomes violet and later red-brown. After cooling ice is added and also hydrochloric acid, the acid liquid being extracted with benzene.

By fractional crystallization two substances may be obtained from the benzene solution:—
1. A product more difficultly soluble in benzene which crystallizes from this solvent in the form of colorless leaflets, which is readily soluble in soda solution or dilute aqueous alkalies and also in ether and alcohol but somewhat less soluble in benzene. By heating in dimethylaniline, the product splits off carbon dioxide. According to analysis the substance is a dinitrodichlordiphenylacetic acid.
2. From the benzene remaining as mother liquor after the product more difficultly soluble has been filtered off, a more readily soluble product crystallizes in the form of orange needles which does not dissolve in aqueous alkalies. Its solution in pyridine is yellow and becomes red-violet by the addition of alkali.

Example 6

A solution of 17.2 parts of 2-nitrobenzoic acid and 6 parts of acetophenone in 60 parts of pyridine is allowed to drop while stirring into a suspension of 30 parts of potassium hydroxide in 130 parts of pyridine at from 5° to 10° C. A current of air is passed through the mixture which becomes colored a reddish blue in a short time. The reaction mixture is worked up in the manner described in the first paragraph of Example 5, and the yellow-brown precipitate is crystallized from alcohol. The product dissolves readily to give a colorless solution in soda solution and in aqueous alkalies. It dissolves in alcoholic alkali giving a red-brown coloration. It crystallizes from dilute alcohol in the form of colorless needles. According to analysis and its properties, it is probably a nitrodesoxybenzoin-carboxylic acid.

Example 7

A mixture of 33 parts of 3-nitrobenzoic acid, 12 parts of benzyl cyanide and 50 parts of pyridine is allowed to flow in a current of air at from 45° to 50° C. into a suspension of 45 parts of ground sodium hydroxide in 150 parts of pyridine. The mass becomes deep violet in color. When the reaction is completed, the reaction product is precipitated by introducing it while stirring into a mixture of ice and hydrochloric acid, filtered by suction after standing for some time and crystallized from alcohol. Orange needles are thus obtained which are practically insoluble in alkali metal carbonate solutions and which dissolve in cold aqueous alkalies only with difficulty giving a red-violet coloration, but readily in alcoholic alkalies giving a blue-violet coloration. According to analysis the product seems to be a nitrodiphenylacetonitrilecarboxylic acid or an isomeric compound. From the alcoholic mother liquors from the crystallization described above by inspissation a substance is obtained which is soluble in aqueous soda solutions and crystallizes from quinoline in colorless needles.

The same product is formed, when instead of 3-nitrobenzoic acid, 2-chlor-5-nitrobenzoic acid is condensed with benzyl cyanide.

Example 8

A solution of 40.5 parts of 3'-nitro-2-benzoylbenzoic acid and 15 parts of benzyl cyanide in 150 parts of pyridine is introduced while stirring into a mixture of 45 parts of ground potassium hydroxide and 270 parts of pyridine at from 15° to 20° C., a powerful current of air being led through the liquid. After increasing the temperature to from 20° to 25° C. the whole is stirred for some time and the red-violet reaction mixture is then worked up as described in Example 1. The reaction product crystallizes from benzene in the form of orange colored needles. It dissolves readily in alcohol and pyridine, the solutions becoming violet upon the addition of caustic alkalies. In hot aqueous alkalies the product dissolves giving a violet solution.

If instead of 3'-nitro-2-benzoylbenzoic acid 3'-nitro-4'-chlor-2-benzoylbenzoic acid or 3'-nitro-4'-methyl-2-benzoylbenzoic acid is used, condensation products of similar properties are obtained.

Sodium sulphide may be employed instead of potassium hydroxide.

Instead of benzyl cyanide other compounds of the kind defined above such as malonic nitrile may be condensed with 3'-nitro-2-benzoylbenzoic acid in an analogous manner; the product obtainable with malonic nitrile dissolves in pyridine giving a bluish-red solution upon the addition of caustic potash.

Example 9

27.1 parts of 3'-nitro-2-benzoylbenzoic acid and 4.5 parts of acetonitrile are dissolved in 100 parts of pyridine and the solution obtained is added to a suspension obtained by treating 24 parts of caustic potash and 24 parts of benzene in a mill and dilution with 100 parts of pyridine, a current of dry air being passed through the mass. The latter is warmed for 1 hour at 85° C. and then worked up as described in Example 1. A light brown reaction product is obtained dissolving in aqueous solutions of caustic alkali or of alkali metal carbonates giving yellow-brown solutions. In mixtures of caustic potash with pyridine and some methyl alcohol the product dissolves giving a bluish-red solution.

If 3'-nitro-4'-methyl-2-benzoylbenzoic acid is condensed with aceto nitrile at from 30° to 35° C. under otherwise similar conditions a product of similar properties is obtained.

Example 10

A dry current of air is led into a boiling suspension of 30 parts of ground potassium hydroxide in 300 parts of benzene and a solution of 9 parts of 2.5-dichlornitrosobenzene and 2 parts of acetonitrile in 100 parts of benzene is introduced within the course of 25 minutes. The whole is then boiled for some time. After working up the red reaction mixture in the usual manner and crystallizing the reaction product from dilute alcohol, orange needles are obtained. The product is readily soluble in pyridine, alcohol and glacial acetic acid; the solution in pyridine becomes red-violet upon the addition of alkali.

If 2.5-dichlornitrosobenzene be condensed with benzyl cyanide by means of potassium hydroxide in pyridine at from 15° to 20° C. a product is obtained which dissolves in pyridine in the presence of caustic alkali giving a greenish-blue coloration.

Example 11

A solution of 7.5 parts of benzyl cyanide in 20 parts of pyridine is stirred into a mixture of 10 parts of 2-chlornitrobenzene, 20 parts of ground potassium hydroxide and 120 parts of pyridine at from 0° to 5° C. The red violet reaction mixture is stirred for some time and is then diluted with benzene, filtered by suction and worked up according to Example 1. The condensation product thus obtained crystallizes from dilute alcohol in the form of yellow needles and according to analysis seems to be a chlornitrodiphenylacetonitrile. It is readily soluble in pyridine and glacial acetic acid, less readily in benzene and alcohol. Its solution in pyridine becomes violet-red upon the addition of caustic alkali.

Example 12

A mixture of 15.3 parts of benzyl cyanide and 20 parts of pyridine are introduced into a suspension of 21 parts of finely divided potassium hydroxide and 10 parts of 4-nitroanisol in 120 parts of pyridine cooled down to 5° below zero C. The mixture thus obtained is stirred for some hours at 5° below zero C. and diluted with benzene. The mass is filtered by suction and the residue is washed with benzene and ether. Then it is dissolved in water; the aqueous solution is acidified and extracted with ether and the solvent is evaporated from the ethereal solution. The remaining residue is subjected to fractional crystallization from petroleum ether. A product difficultly soluble in the said solvent is obtained in colorless crystals. According to analysis and to its properties the product is identical with the nitrodiphenylacetonitrile obtained according to Example 1. Furthermore a colorless crystalline product is obtained which is more readily soluble in petroleum ether.

Example 13

18 parts of a paste prepared by treating equal parts of caustic potash and benzene in a ball mill are diluted with 35 parts of pyridine and the mixture is cooled down to zero ° C. and introduced slowly into a solution of 7 parts of meta-nitraniline and 6 parts of benzylcyanide in 40 parts of pyridine at 0° C. while stirring and passing through the mass a current of dry air. After the introduction is completed the mixture is stirred for further two hours at 0° C. and then worked up in the manner described in Example 1. An orange red condensation product is obtained which crystallizes from diluted alcohol in red prisms having a green superficial lustre. The product dissolves in pyridine giving an orange red solution which upon the addition of caustic potash changes to red-violet. It dyes acetate artificial silk orange shades.

*Example 14*

25 parts of a paste obtainable by treating equal parts of potassium hydroxide and benzene in the mill are suspended in 40 parts of pyridine. A solution of 6.8 parts of meta-nitrotoluene and 6 parts of benzylcyanide in 12 parts of pyridine is introduced into the said suspension at 20° C. while stirring. If the introduction is completed the mixture is stirred for a further half an hour at the same temperature. The reaction mass is worked up according to Example 1. The reaction product is a water-insoluble colorless oil which solidifies while standing to form a crystalline mass. It dissolves readily in ether, glacial acetic acid, methyl alcohol, ethyl alcohol and pyridine. The coloration of its solution in pyridine changes to deep blue upon the addition of caustic potash while its solution in alcohol becomes blue-violet.

*Example 15*

40 parts of a paste obtainable by treating equal parts of caustic potash and benzene in the mill are diluted with 60 parts of pyridine. The mixture obtained is introduced into a solution of 17.4 parts of 8-nitroquinoline and 13 parts of benzylcyanide in 150 parts of pyridine at 15° C. while stirring and passing therethrough a current of dry air. The mixture is stirred for further two hours at between 15 and 20° C. It is worked up as described in Example 1 and a condensation product is obtained which crystallizes from diluted pyridine in pale yellow prisms. It is easily soluble in glacial acetic acid, acetone and pyridine; the coloration of the pyridine solution changes to red upon the addition of caustic potash. The condensation dissolves in diluted hot hydrochloric acid and may be precipitated from the solution obtained by means of ammonia.

*Example 16*

40 parts of a paste obtainable by treating equal parts of caustic potash and benzene in the mill are diluted with 100 parts of pyridine. The mixture obtained is introduced slowly into a solution of 12 parts of α-nitroanthraquinone and 6 parts of benzylcyanide in 200 parts of pyridine at 20° below zero C. As soon as the introduction is completed the temperature is slowly raised up to 15° C. whereby the bluish-red initial coloration of the reaction mass turns into a turbid blue-violet. The mixture is stirred for further 2 hours at 20° C., diluted with 200 parts of benzene, allowed to stand for some time and filtered by suction. The filtering residue is washed with water whereby the condensation product remains in the insoluble part. It is extracted therefrom by means of ether. After evaporating the latter and crystallizing the evaporation residue from diluted acetone nearly colorless crystal druses are obtained which dissolve readily in ether, ethyl alcohol and pyridine; the coloration of the solution in pyridine turns to carmine-red upon the addition of potash hydroxide.

*Example 17*

12.8 parts of meta-nitrophenylacetanilide (obtainable by heating meta-nitraniline with phenylacetic acid chloride in ortho-dichlorbenzene) are dissolved in 70 parts of pyridine; 30 parts of a paste obtainable by treating equal parts of caustic potash and benzene in the mill, diluted with 60 parts of benzene are then introduced into the said solution at 24° C. The coloration of the liquid immediately changes to blue-violet. The mass is allowed to stand for several hours, diluted with 400 parts of benzene and filtered by suction. The filtering residue is washed with benzene and dissolved in water. The aqueous solution is acidified and the reaction product is extracted by means of ether. It is a light-brown powder readily soluble in ether, ethyl alcohol, acetone and pyridine. Its solution in pyridine becomes intensely blue-violet upon the addition of caustic potash.

*Example 18*

5 parts of a paste obtainable by treating equal parts of caustic potash and benzene in the mill are diluted with 7 parts of pyridine and the mixture obtained is introduced at 20° C. into a solution of 3 parts of ortho-nitroanisol and 2.5 parts of benzylcyanide in 25 parts of pyridine while stirring and passing a current of dry air through the mass. The blue-violet mixture is stirred for further 2 hours at between 20 and 25° C. and worked up as described in Example 1 whereby a yellow condensation product is obtained which crystallizes from benzene, ethyl alcohol or glacial acetic acid in yellow needles. It is readily soluble in many organic solvents; its solution in pyridine becomes bluish-red if caustic potash is added; it dissolves in aqueous alkali giving a yellow-brown solution. According to analysis the product seems to be an hydroxylamino-methoxy-diphenylacetic nitrile.

*Example 19*

36 parts of a paste obtained by treating equal parts of caustic potash and benzene in the mill are diluted with 50 parts of pyridine and the mixture obtained is added to a solution of 15 parts of meta-nitrobenzaldehyde and 13 parts of benzylcyanide at 0° C. while stirring and passing a current of dry air through the mass. The coloration of the mixture which is stirred for further 2 hours at the same temperature turns to red-violet. The mixture is diluted with benzene, filtered by suction and the filtrate is inspissated on the water-bath. A condensation product separates in the form of a grey-brown solid mass from which by recrystallization from glacial acetic acid colorless leaflets are obtained. The product dissolves readily in benzene, pyridine and glacial acetic acid and somewhat more difficulty in ethyl alcohol. Its solution in pyridine becomes carmine-colored if warmed with caustic potash.

*Example 20*

A paste obtained by treating 12 parts of caustic potash and 12 parts of benzene in the mill and adding 50 parts of pyridine are introduced into a solution of 17.3 parts of 1-nitronaphthalene and 7.2 parts of malonic nitrile in 150 parts of pyridine while passing through the mass a current of dry air and maintaining a temperature of 25° C. The reaction mixture is then warmed for 2 hours at 35° C. During this treatment the mass becomes intensely carmine red. By working up in the manner described in Example 1 a brown substance is obtained dissolving in aqueous alkalies giving a brown-violet solution. The solution of the reaction product in pyrdine becomes red-violet upon the addition of caustic potash.

Other naphthalene derivatives containing groupings of the kind defined in the description such as 1-chlor-4-nitronaphthalene may be condensed in an analogous manner, for example with benzyl cyanide.

What we claim is:—

1. The process of producing condensation products which comprises causing an aromatic component containing one group X selected from the class consisting of the nitro- and nitroso group, the said component corresponding to the general formula

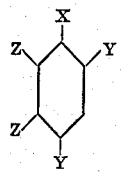

wherein one Y represents a member of the group consisting of hydrogen, halogen and alkoxy groups, the other Y represents a hydrogen atom, and wherein the Z's stand for a member of the group consisting of hydrogen, the grouping

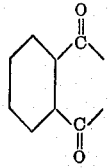 and the grouping 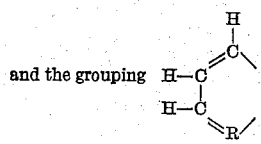

R being CH or N, to react in the presence of an alkaline condensing agent with a compound selected from the class consisting of the aliphatic, aliphatic-aromatic and aromatic series, to one carbon atom of which are attached at least 2 hydrogen atoms, the said compound containing directly connected with the said carbon atom a grouping activating the said hydrogen atoms, the said grouping being selected from the class consisting of the carbonyl group, the nitrile group and the amidated and esterified carboxylic acid groups.

2. The process of producing condensation products which comprises causing an aromatic component containing one group X selected from the class consisting of the nitro- and nitroso group, the said component corresponding to the general formula

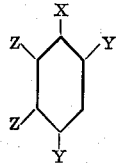

wherein one Y represents a member of the group consisting of hydrogen, halogen and alkoxy groups, the other Y represents a hydrogen atom, and wherein the Z's stand for a member of the group consisting of hydrogen, the grouping

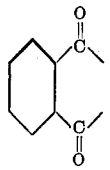 and the grouping 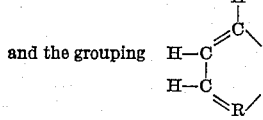

R being CH or N, to react in the presence of an alkaline condensing agent in an organic diluent with a compound selected from the class consisting of the aliphatic, aliphatic-aromatic and aromatic series, to one carbon atom of which are attached at least 2 hydrogen atoms, the said compound containing directly connected with the said carbon atom a grouping activating the said hydrogen atoms, the said grouping being selected from the class consisting of the carbonyl group, the nitrile group and the amidated and esterified carboxylic acid groups.

3. The process of producing condensation products which comprises causing an aromatic component containing one group X selected from the class consisting of the nitro- and nitroso group, the said component corresponding to the general formula

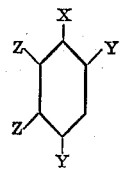

wherein one Y represents a member of the group consisting of hydrogen, halogen and alkoxy groups, the other Y represents a hydrogen atom, and wherein the Z's stand for a member of the group consisting of hydrogen, the grouping

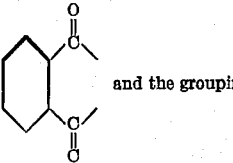 and the grouping 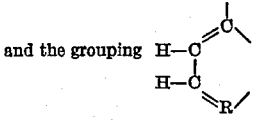

R being CH or N, to react in the presence of an alkali metal hydroxide in an organic diluent with a compound selected from the class consisting of the aliphatic, aliphatic-aromatic and aromatic series, to one carbon atom of which are attached at least 2 hydrogen atoms, the said compound containing directly connected with the said carbon atom a grouping activating the said hydrogen atoms, the said grouping being selected from the class consisting of the carbonyl group, the nitrile group and the amidated and esterified carboxylic acid groups.

4. The process of producing condensation products which comprises causing an aromatic component containing one group X selected from the class consisting of the nitro- and nitroso group, the said component corresponding to the general formula wherein one Y represents a member of the group consisting of hydrogen, halogen and alkoxy groups, the other Y represents a hydrogen atom, and wherein the Z's stand for a member of the group consisting of hydrogen, the grouping and the grouping R being CH or N, to react in the presence of caustic potash in an organic diluent with a compound selected from the class consisting of the aliphatic, aliphatic-aromatic and aromatic series, to one carbon atom of which are attached at least 2 hydrogen atoms, the said compound containing directly connected with the said carbon atom a grouping activating the said hydrogen atoms, the said grouping being selected from the class consisting of the carbonyl group, the nitrile group and the amidated and esterified carboxylic acid groups.

5. Condensation products obtainable by causing an aromatic component containing one group X selected from the class consisting of the nitro- and nitroso group, the said component corresponding to the general formula

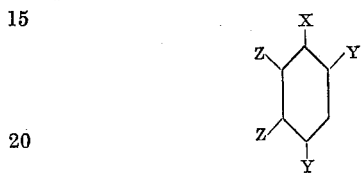

wherein one Y represents a member of the group consisting of hydrogen, halogen and alkoxy groups, the other Y represents a hydrogen atom, and wherein the Z's stand for a member of the group consisting of hydrogen, the grouping

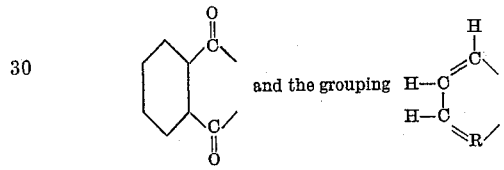

R being CH or N, to react in the presence of an alkaline condensing agent with a compound selected from the class consisting of the aliphatic, aliphatic-aromatic and aromatic series, to one carbon atom of which are attached at least 2 hydrogen atoms, the said compound containing directly connected with the said carbon atom a grouping activating the said hydrogen atoms, the said grouping being selected from the class consisting of the carbonyl group, the nitrile group and the amidated and esterified carboxylic groups.

6. Condensation products obtainable by causing a mononitro-2-benzoylbenzoic acid to react in the presence of an alkaline condensing agent with a compound selected from the class consisting of the aliphatic, aliphatic-aromatic and aromatic series, to one carbon atom of which are attached at least 2 hydrogen atoms, the said compound containing directly connected with the said carbon atom a grouping activating the said hydrogen atoms, the said grouping being selected from the glass consisting of the carbonyl group, the nitrile group and the amidated and esterified carboxylic acid groups.

7. Condensation products obtainable by causing 3'-nitro-2-benzoylbenzoic acid to react in the presence of an alkaline condensing agent with a compound selected from the class consisting of the aliphatic, aliphatic-aromatic and aromatic series, to one carbon atom of which are attached at least 2 hydrogen atoms, the said compound containing directly connected with the said carbon atom a grouping activating the said hydrogen atoms, the said grouping being selected from the class consisting of the carbonyl group, the nitrile group and the amidated and esterified carboxylic acid groups.

8. Condensation products obtainable by causing 3'-nitro-2-benzoylbenzoic acid to react in the presence of an alkaline condensing agent with benzylcyanide.

9. Condensation products obtainable by causing 3'-nitro-4'-chlor-2-benzoylbenzoic acid to react in the presence of an alkaline condensing agent with benzylcyanide.

10. Condensation products obtainable by causing 3'-nitro-4'-methyl-2-benzoylbenzoic acid to react in the presence of an alkaline condensing agent with benzylcyanide.

HEINRICH NERESHEIMER.
WILHELM RUPPEL.